Figure 1:
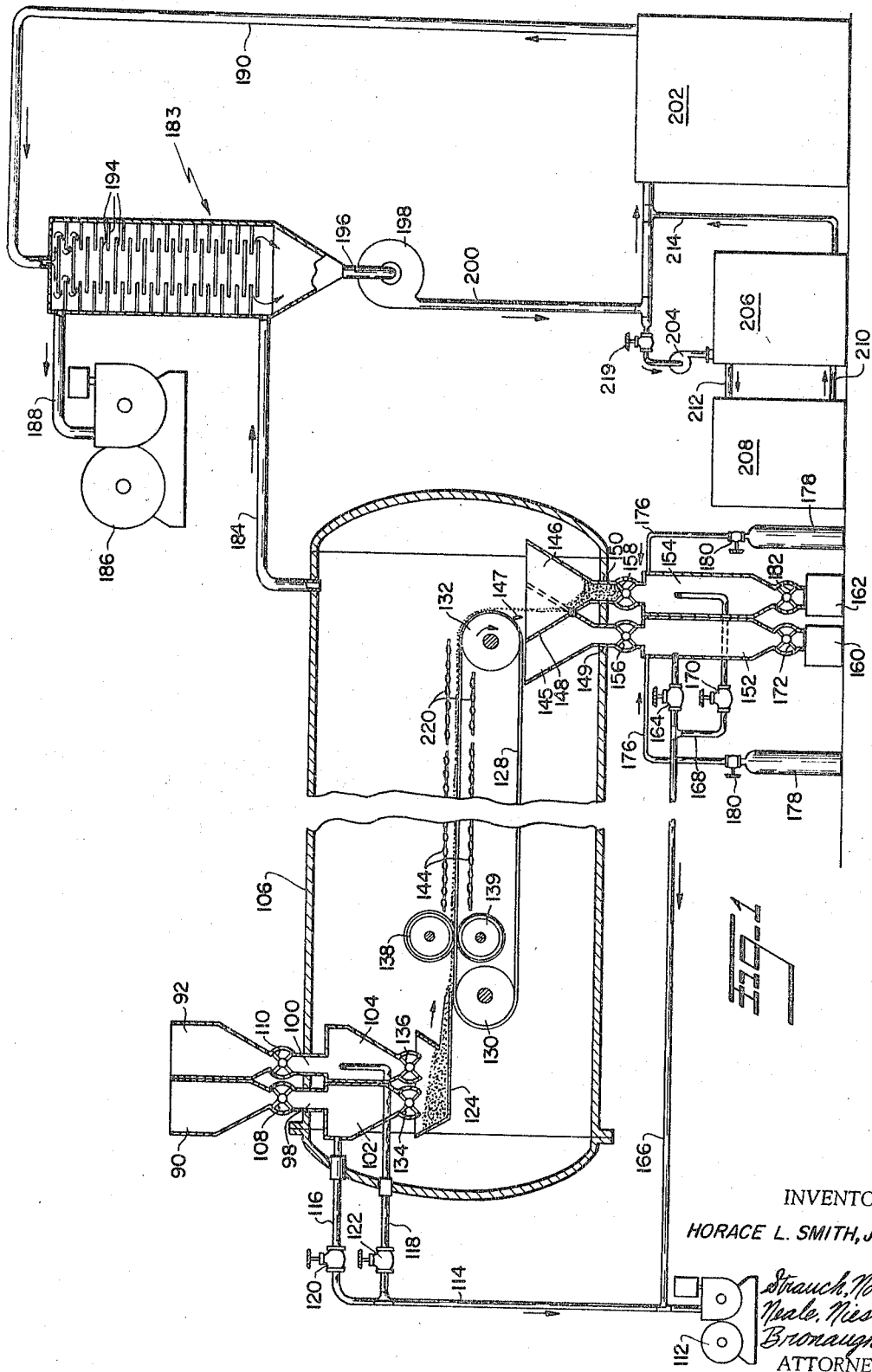

June 13, 1967     H. L. SMITH, JR     3,324,565
APPARATUS AND METHOD FOR FREEZE DRYING
Filed July 21, 1966     2 Sheets-Sheet 1

INVENTOR
HORACE L. SMITH, JR.

Strauch, Nolan,
Neale, Nies &
Bronaugh
ATTORNEYS

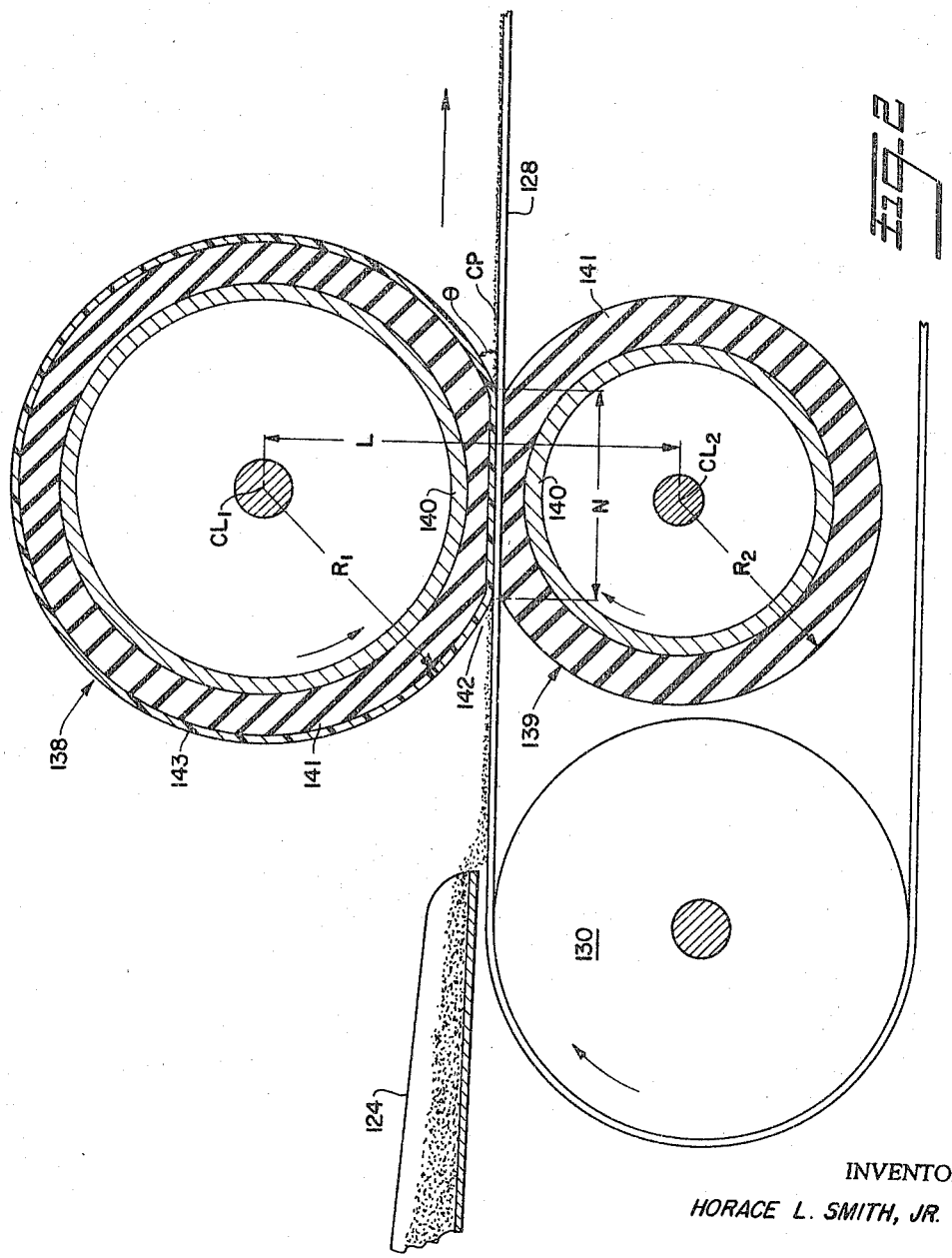

United States Patent Office 3,324,565
Patented June 13, 1967

3,324,565
APPARATUS AND METHOD FOR FREEZE DRYING
Horace L. Smith, Jr., Richmond, Va., assignor to Hupp Corporation, Cleveland, Ohio, a corporation of Virginia
Filed July 21, 1966, Ser. No. 566,967
8 Claims. (Cl. 34—5)

This invention relates to drying and, more specifically, to novel, improved methods of and apparatus for freeze drying liquid and semiliquid products.

In may copending application No. 234,285 filed Oct. 31, 1962 (now Patent No. 3,266,169), I disclosed continuous type freeze drying apparatus in which the product to be dried is reduced to a frozen powder and spread in a layer on a conveyor disposed in a vacuum chamber. As the frozen powder is moved through the vacuum chamber on the conveyor, radiant heaters sublime the moisture from it, reducing it to a dry state.

Depending upon the product involved, considerable difficutly may be experienced with the loose particles bouncing or flying off the conveyor in the above-mentioned and other freeze drying apparatus in which the product in the evacuated chamber is in powdered or other particulate form. This can result in a build-up of powdered product within the vacuum vessel great enough to materially reduce the efficiency and/or prevent proper operation of the apparatus.

Periodic cleaning of the apparatus during operation to remove such build-up is impractical as is frequent shutting down of the apparatus to remove the build-up of powdered product. Accordingly, the tendency of the powdered product to leave the conveyor may pose a serious problem.

I have now discovered that this problem can be easily and inexpensively solved by bonding the particles to each other and to the conveyor after they are spread on it to form a more-or-less continuous thin layer or sheet of frozen product frozen to the conveyor. This is acomplished by employing the phenomenon of regelation by which pieces of ice will freeze to one another when pressed together, even at sub-freezing temperatures and subatmospheric pressures. In the preferred embodiment of my invention, I take advantage of this phenomenon by passing the conveyor of the apparatus disclosed in my earlier application, on which a layer of the frozen powder has been deposited, through the nip between a pressure roll and a backup roll. This provides the necessary pressure to bond the particles of the product to be dried to each other and to the conveyor.

The net result is a generally continuous sheet of product frozen to the conveyor, eliminating the problem of product flying off the conveyor and building up in the vacuum chamber.

Another advantage of forming the powdered product into a sheet frozen to the conveyor is that the thickness of the product layer is materially reduced. This is an important consideration because, as discussed in my earlier application, the drying rate can be increased fourfold by halving the thickness of the product layer. Accordingly, the present invention is capable of materially increasing the drying efficiency of continuous type freeze drying apparatus such as that disclosed in my earlier application. Further increases in the drying rate result from the bonding of the particles, as such, because this makes the product more conductive so that heat is transferred more efficiently to the center of the layer than in a layer composed of unbonded particles.

A further significant advantage of the present invention is that deviations in the thickness of the layer of product are minimized or eliminated by compression of the layer, increasing the uniformity of drying. This results in a final product of greater uniformity and, consequently, higher quality.

From the foregoing it will be apparent that one important and primary object of the present invention resides in the provision of novel improved freeze drying methods and apparatus.

Other related and important but more specific objects of the present invention reside in the provision of continuous type freeze drying apparatus including a vacuum chamber with a product transporting conveyor therein and methods for freeze drying products in such apparatus, in which:

(1) Displacement of the frozen product from the conveyor and a consequent build-up of the product in the vacuum chamber is eliminated as a serious problem;

(2) There is higher efficiency in the transfer of heat through the product layer and consequently a higher drying rate than in those heretofore proposed;

(3) There are minimal variations in the thickness of the product layer and consequently more uniformity in the dried product;

(4) The product is deposited on the conveyor as a powder and then pressed to bond the particles to each other and to be conveyor.

Additional objects, further important features, and other advantages of the present invention will become more fully apparent from the appended claims and as the ensuing detailed description and discussion proceeds in conjunction with the accompanying drawing, in which:

FIGURE 1 is a generally diagrammatic section through freeze drying apparatus constructed in accord with the principles of the present invention; and FIGURE 2 is a fragment of FIGURE 1, to an enlarged scale.

Referring now to FIGURES 1 and 2, the novel freeze drying process provided by the present invention consists, generally, in reducing the product to be dried to a frozen, finely divided powder; spreading the powder in a thin layer on a conveyor in a high vacuum chamber; compressing the powder to bond the particles to each other and to the conveyor; and heating the frozen powder to sublime the water from it.

The product may be reduced to a frozen powder in any desired manner. Two exemplary ways of accomplishing this are disclosed in my earlier application.

The finely divided, frozen product is delivered to the inlets of feed hoppers 90 and 92. From feed hoppers 90 and 92 the frozen product flows through conduits 98 and 100 into hoppers 102 and 104 located in a horizontally elongated vacuum vessel 106. Valves 108 and 110, disposed in conduits 98 and 100, control flow from hopper 90 to hopper 102 and from hopper 92 to hopper 104. A vacuum may be produced in hoppers 102 and 104 by a vacuum pump 112 which is connected to the hoppers by a main vacuum line 114 and branch vacuum lines 116 and 118. Valves 120 and 122, interposed in branch vacuum lines 116 and 118, permit hoppers 102 and 104 to be isolated from the ambient atmosphere after they have been evacuated.

Disposed below the outlets of hoppers 102 and 104 is the inlet of a vibrating feeder 124. Feeder 124 deposits the frozen, comminuted product in a thin layer of uniform thickness on the inlet end of a conveyor including thin, endless, stainless steel or similar belt 128 trained over a pair of spaced, rotatably mounted rollers or pulleys 130 and 132, either one or both of which may be driven in the direction indicated by the solid arrows by an appropriate power source (not shown). Belt 128 may be coated with a radiant energy absorbing material in the manner described in my earlier application to equalize the transfer of heat to the upper and lower sides of the product layer.

Hoppers 90, 102 and 92, 104 are intended to be alternately employed to maintain a continuous flow of product onto conveyor belt 128. Valve 108 is opened to fill hopper 102 with a charge of the frozen powdered product from hopper 90 and closed to seal the upper end of hopper 102, which is then evacuated by opening valve 120 to connect hopper 102 to vacuum pump 112. After the hopper is evacuated, valve 120 is closed, isolating the hopper from the atmosphere. A valve 134 disposed in the outlet end of hopper 102 is then opened, allowing the product to flow into vibrating feeder 124 which spreads it on belt 128.

After hopper 102 is filled and valve 108 closed, valve 110 may be opened, causing the frozen product to flow into hopper 104. The hopper is then evacuated with the product eventually passing through a valve 136 disposed in the outlet end of hopper 104 into vibrating feeder 124.

In the present invention, a pressure roll 138 and a back-up roll 139 are located immediately adjacent the outlet of vibrating feeder 124 to exert pressure on the frozen powder and thereby bond the particles to each other and to the upper surface of conveyor belt 128. As discussed above, this substantially eliminates the heretofore vexing problem of particles of product bouncing or flying off the conveyor and building up inside the vacuum chamber. In addition, as was also discussed above, fusion of the particles together increases the conductivity of the product layer and, consequently, the rate at which heat is transferred to the center of the layer. Also, compression of the particles decreases the thickness of the product layer, materially increasing the rate at which the product can be dried. A further important advantage of passing the product through the nip between rolls 138 and 139 is that pressure roll 138 compresses the layer product to a uniform thickness so that the product is uniformly treated and variations in the dried product minimized or eliminated.

As best shown in FIGURE 2, rolls 138 and 139 are disposed in parallel, spaced apart relationship with roll 138 being spring-loaded or otherwise biased in a downward direction so that the distance L between the center lines $CL_1$ and $CL_2$ of the two rolls is less than the sum of the radii $R_1$ and $R_2$ of the rolls. The two rolls 138 and 139 are rotatably supported in suitable bearings (not shown) and may be driven by the conveyor belt 128 running therebetween or by any other type of drive system which may be desired.

Both of the rolls 138 and 139 include a cylindrical inner member 140 surrounded by a sleeve 141 of resilient, elastically deformable material. Because dimension L is less than the sum of radii $R_1$ and $R_2$, there is area contact between the two rolls and conveyor belt 128 through a span indicated by reference character N.

As the loose frozen powder LP passes through the nip 142 between the two rolls, it is increasingly compressed, bonding the particles together and to conveyor 128 as shown by reference character CP. The readily deformable elastomeric sleeves 141 on rolls 138 and 139 make it practicable to exert pressure on the product layer over a relatively large area. This insures that sufficient pressure is exerted on all particles in the product layer for a sufficiently long time to produce the desired bonding. In addition, the large pressure area results in the exertion of substantially uniform pressure on all areas of the layer, compacting the entire layer to substantially the same thickness, even if the frozen powder is not uniformly distributed across conveyor 128 by feeder 124.

Another advantage of the resilient sleeve 141 on pressure roll 138 is that the angle $\theta$ between the compressed product layer CP and pressure roll 138 at the exit side of nip 142 is relatively steep. This results in a tendency for roll 138 to break away from the frozen layer CP, leaving the latter firmly adhered to conveyor 128. In the absence of such an abrupt change of direction of the roll, there would be a pronounced tendency for the compressed layer to adhere to the pressure roll as well as the conveyor.

Also, the freezing together of the particles does not begin until the pressure is released; and this occurs very rapidly. Therefore, only a narrow strip of roll 138 is in contact with the layer of freezing product. The bottom side of this layer is adhered to adjacent, already frozen portions of the product layer on conveyor 128. This further increases the tendency of the frozen layer to adhere to conveyor belt 128 and not to roll 138.

To further reduce the tendency of the compressed layer to adhere to pressure roll 138, the elastomeric sleeve 141 of the latter is preferably surrounded by a thin sleeve 143 of Teflon or other material with non-sticking properties.

Proper adhesion of the frozen product to conveyor 128 may, in some instances, require that the temperature of conveyor 128 be at a given level as it approaches the nip 142 between rolls 138 and 139. Regulation of the temperature of conveyor 128 may be readily accomplished by circulating a liquid of the proper temperature through the interior of conveyor belt supporting roller 130. Similarly, if deemed necessary, temperature changes effecting the formation of the layer bonded to conveyor 128 may be regulated by circulating liquid of appropriate temperature through roll 138 or roll 139 or both.

As the frozen product bonded to conveyor 128 is carried from rolls 138 and 139 through vacuum vessel 106 toward the end of the conveyor trained over roller 132, it is heated by radiators 144 disposed on opposite sides of the upper run of the conveyor (the radiators may be of any desired type such as, for example, those disclosed in my earlier application). The interior of vacuum vessel 106 is maintained at a pressure below 0.180 inch of mercury absolute, a typical pressure being on the order of 0.0126 inch of mercury absolute. At this pressure the water in the product will, upon the application of heat, pass directly from the frozen state to the vapor state, i.e., sublimate, at temperatures of $-20°$ F. or higher. Radiators 144 therefore cause the moisture in the frozen product to sublime. Preferred methods of regulating the supply of heat are described in my earlier application to which reference may be made if deemed necessary for a complete understanding of the present invention.

From conveyor belt 128, the dried or dehydrated product flows into one of two discharge hoppers 145 or 146. A doctor blade 147 may be employed to scrape the dried material from belt 128. The flow of the dried product may be diverted into a selected one of the two hoppers 145 and 146 by a selectively adjustable feeder vane 148 mounted between the two hoppers.

From hoppers 145 and 146 the dried product passes through conduits 149 and 150 into hoppers 152 and 154. Valves 156 and 158, disposed in conduits 149 and 150, control the flow of the dried product between hoppers 145 and 152 and between hoppers 146 and 154 and seal the lower ends of hoppers 145 and 146 from the ambient atmosphere. From hoppers 152 and 154 the dried product flows into containers 160 and 162, for example.

The two discharge hopper arrangements, 145 and 152 and 146, 154 are intended to be employed alternately. Thus, with hopper 145 full and the dried product flowing from conveyor belt 128 into hopper 146, hopper 152 will be evacuated by opening a valve 164 interposed in a vacuum line 166 connecting hopper 152 to vacuum pump 112 (hopper 154 may similarly be evacuated through a line 168 connected between the hopper and line 166 and controlled by a valve 170). Valve 164 is then closed, sealing hopper 152 from the ambient atmosphere, and valve 156 is opened, allowing dried product in hopper 145 to flow into hopper 152. Valve 156 is then closed to establish a seal between hoppers 145 and 152, and a valve 172 at the outlet end of hopper 152 is opened to establish communication between hopper 152 and container 160.

Hopper 152 is connected by a supply line or conduit 176 to a bottle 178 (or other source) of nitrogen or other dry, inert gas which will not oxidize or introduce water vapor into the dried product. After hopper outlet valve 172 is opened, a valve 180 in nitrogen supply line 176 is opened, allowing the nitrogen to flow into hopper 152 and break the vacuum therein so that the hopper contents will flow freely into container 160. A similar vacuum breaking arrangement identified by identical reference characters is provided for hopper 154.

After hopper 152 is emptied, valve 172 is closed; and valve 170 is opened to evacuate hopper 154. Adjustable feeder vane 148 may then be moved to the position shown in dotted lines and the dried product discharged from conveyor belt 128 into hopper 145. Then, in the manner described above in conjunction with hopper arrangement 145, 152, the product in hopper 146 may be discharged through valve 158, hopper 154, and hopper outlet valve 182 into container 162.

It is necessary for satisfactory operation to continuously remove the evaporated water from vacuum vessel 106 since, at 0.0126 in. Hg abs. pressure and —20° F., for example, each pound of water removed from the product occupies several thousand cubic feet. The exemplary system employed in the apparatus of FIGURE 1 for this purpose includes a condenser 183 connected to vacuum vessel 106 by a conduit 184 and to a vacuum pump 186 by a conduit 188. Vacuum pump 186, which is also used to pump down vacuum vessel 106 when the system is started up, draws the accumulated water vapor from vacuum vessel 106 through conduit 184 and upwardly through condenser 183 where it is absorbed by a refrigerated solution of an absorbent liquid such as lithium chloride, which is pumped through a conduit 190 into the upper end of condenser 183 and flows downwardly through condenser 183 over interleaved horizontal baffles 194.

From the lower end of condenser 183 the lithium chloride solution, heated and diluted by absorbed water vapor, flows through a conduit 196 into circulating pump 198, which pumps it through conduit 200 into a chiller 202 which may be any appropriate type of refrigeration apparatus. Chiller 202 refrigerates the concentrated lithium chloride solution for recirculation to condenser 183.

A second, small circulating pump 204 continuously draws a portion of the diluted solution from conduit 200 into a counterflow type heat exchanger 206 where it is concentrated by boiling off the absorbed water. The necessary heat may be supplied by a boiler 208 connected to heat exchanger 206 by conduits 210 and 212. Both boiler 208 and heat exchanger 206 may be of any conventional construction.

From heat exchanger 206 the reconcentrated lithium chloride solution is forced by pump 204 through conduit 214 into conduit 200. A valve 219 on the intake side of pump 204 permits varied proportions of the circulating lithium chloride solution to be drawn into heat exchanger 206 so that the amount of vapor removed in the heat exchanger will equal the amount absorbed in condenser 183. In this manner the condensible water vapor is removed from the system. Non-condensible vapors which leak into the system are removed from condenser 183 through offtake conduit 188 by vacuum pump 186.

Some products are so heat sensitive that, after the moisture has been sublimed, it is necessary not only to terminate the application of radiant heat, but to actually cool the dried product to prevent it from overheating. FIGURE 1 illustrates two chilling elements or components for this purpose. Either one or both of these may be employed, depending upon the product.

The first of the chilling components is the roll 132 at the discharge end of endless belt 128. The second consists of chilling panels 220 disposed on opposite sides of the upper run of the endless belt 128 adjacent its discharge end.

Chilled liquid may be circulated through chilling roll 132 and chilling panels 220 from any suitable refrigeration apparatus such as chiller 202. Suitable manually operated valves (not shown) may be provided to control the flow rate through the chilling roll and panels and, consequently, the rate at which heat is removed from the dried product.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Freeze drying apparatus of the continuous type, comprising:
   (a) a vacuum vessel;
   (b) means for maintaining the pressure in said vacuum vessel at a maximum of about 0.180 inch of mercury absolute;
   (c) conveyor means for transporting the product to be dried through said vacuum vessel;
   (d) means for introducing said product in the form of frozen granules onto said conveyor means;
   (e) means for exerting pressure on said granules to bond said granules to each other and to said conveyor means to thereby form a sheet of frozen product on said conveyor means; and
   (f) means for heating the product bonded to said conveyor means to sublime the water therefrom as said product is transported through said vacuum vessel by said conveyor means.

2. Freeze drying apparatus of the continuous type, comprising:
   (a) a vacuum vessel;
   (b) means for maintaining the pressure in said vessel at a maximum of about 0.180 inch of mercury absolute;
   (c) conveyor means comprising an endless belt having a product-supporting leg for transporting the product to be dried through the vacuum vessel;
   (d) means for depositing a layer of the product to be dried in granular form on the product-supporting leg of the endless belt adjacent one end thereof;
   (e) means for bonding the product granules to each other and to the product-supporting leg of the endless belt to form a sheet of frozen product on said belt comprising a deformable, rotatably mounted roll above said product-supporting leg adjacent the point at which the product is introduced thereon, the distance between said belt and the axis of rotation of said roll being smaller than the radius of the roll, whereby there is area contact between said roll and said belt and said roll exerts a particle bonding force on the granular product on said belt as said product passes beneath said roll; and
   (f) means for heating the product bonded to said conveyor means to sublime the water therefrom as said product is transported through said vacuum vessel on said belt.

3. The freeze drying apparatus of claim 2, wherein at least the peripheral portion of said roll is fabricated of a non-sticking material to assist in preventing the frozen product from sticking to said roll.

4. The freeze drying apparatus of claim 2, together with a deformable backup roll aligned with the product compressing roll, said backup roll being on the opposite side of the product-supporting leg of the endless belt from said product compressing roll.

5. The apparatus of claim 2, together with means for adjusting the temperature of the belt as it approaches the point where the granular frozen product is deposited thereon.

6. A method of freeze drying liquid and semiliquid products, comprising the steps of:
   (a) reducing the product to frozen particulate form;
   (b) introducing the particles into a chamber evacuated to a pressure of not greater than 0.180 inch of mercury absolute;
   (c) fusing the particles to each other within the vacuum chamber to facilitate the handling of the product within said chamber; and
   (d) warming the product to a temperature sufficiently high to sublime the water from said product.

7. The method of claim 6, wherein said particles are fused to each other by pressing them together to create bonds therebetween.

8. The method of claim 7, wherein said particles are bonded together by passing them through the nip between two rolls.

References Cited

UNITED STATES PATENTS

| | | | |
|---|---|---|---|
| 2,620,573 | 12/1952 | McMahon | 34—5 |
| 2,751,687 | 6/1956 | Colton | 34—92 |
| 3,266,169 | 8/1966 | Smith | 34—5 |
| 3,270,432 | 9/1966 | Barbareschi | 34—5 |

WILLIAM J. WYE, *Primary Examiner.*